US011424799B2

(12) United States Patent
Meng (10) Patent No.: US 11,424,799 B2
(45) Date of Patent: Aug. 23, 2022

(54) BEAMFORMING-BASED GRANT-FREE NON-ORTHOGONAL MULTIPLE ACCESS TRANSMISSION

(71) Applicant: Google LLC, Mountain View, CA (US)

(72) Inventor: Ling-San Meng, New Taipei (TW)

(73) Assignee: Google LLC, Mountain View, CA (US)

( * ) Notice: Subject to any disclaimer, the term of this patent is extended or adjusted under 35 U.S.C. 154(b) by 99 days.

(21) Appl. No.: 17/059,131

(22) PCT Filed: May 14, 2019

(86) PCT No.: PCT/US2019/032285
§ 371 (c)(1),
(2) Date: Nov. 25, 2020

(87) PCT Pub. No.: WO2019/240903
PCT Pub. Date: Dec. 19, 2019

(65) Prior Publication Data
US 2021/0211171 A1 Jul. 8, 2021

Related U.S. Application Data

(60) Provisional application No. 62/683,747, filed on Jun. 12, 2018.

(51) Int. Cl.
*H04B 7/06* (2006.01)
*H04J 99/00* (2009.01)
(Continued)

(52) U.S. Cl.
CPC ............ *H04B 7/0617* (2013.01); *H04J 15/00* (2013.01); *H04L 1/0071* (2013.01); *H04L 5/005* (2013.01);
(Continued)

(58) Field of Classification Search
CPC ...... H04B 7/0617; H04J 15/00; H04L 1/0071; H04L 5/0026; H04L 5/005; H04L 25/03866
See application file for complete search history.

(56) References Cited

U.S. PATENT DOCUMENTS 9,131,457 B2 9/2015 Nam et al.
9,712,272 B2 7/2017 Zhu et al.
(Continued)

FOREIGN PATENT DOCUMENTS

EP 3068060 9/2016
WO 2016188312 12/2016
(Continued)

OTHER PUBLICATIONS

"Corrected Notice of Allowance", U.S. Appl. No. 16/387,000, dated Jun. 17, 2021, 2 pages.
(Continued)

*Primary Examiner* — Vineeta S Panwalkar
(74) *Attorney, Agent, or Firm* — Colby Nipper PLLC (57) ABSTRACT

This document describes techniques for configuring beamformed wireless communication between a base station (121) and a user equipment (110) for grant-free communication using non-orthogonal multiple access (NOMA). In aspects, a base station (121) transmits downlink reference signals to a user equipment (110) using multiple transmit antenna configurations (402), configures multiple time-frequency resources for NOMA transmission by the user equipment (110) (404), and configures an association between the downlink reference signals and the time-frequency resources for the user equipment (110) (406). The base station (121) transmits the configuration of the time-frequency resources and the association between the downlink reference signals and the time-frequency resources to the user equipment (110) (408). The base station (121) receives
(Continued)

uplink data from the user equipment (110) on one of the time-frequency resources using a receive antenna configuration, determined, at least in part, using one of the transmit antenna configurations (410).

20 Claims, 5 Drawing Sheets

(51) Int. Cl.
  *H04L 1/00* (2006.01)
  *H04L 5/00* (2006.01)
  *H04L 25/03* (2006.01)

(52) U.S. Cl.
  CPC ...... *H04L 5/0026* (2013.01); *H04L 25/03866* (2013.01)

(56) References Cited

U.S. PATENT DOCUMENTS

| | | | |
|---|---|---|---|
| 9,794,924 B2 | 10/2017 | Lee et al. | |
| 10,218,422 B2 | 2/2019 | Raghavan et al. | |
| 10,701,684 B2* | 6/2020 | Yoo | H04L 5/0048 |
| 10,750,488 B2 | 8/2020 | He et al. | |
| 10,904,868 B2 | 1/2021 | Lei et al. | |
| 11,063,705 B2 | 7/2021 | Chou | |
| 11,108,440 B2* | 8/2021 | Cha | H04L 5/0051 |
| 2011/0158117 A1 | 6/2011 | Ho et al. | |
| 2013/0028213 A1 | 1/2013 | Ko et al. | |
| 2015/0195795 A1 | 7/2015 | Loehr et al. | |
| 2016/0066345 A1 | 3/2016 | Sun et al. | |
| 2016/0323832 A1 | 11/2016 | Love et al. | |
| 2017/0012754 A1 | 1/2017 | Sun et al. | |
| 2017/0251462 A1 | 8/2017 | Chae et al. | |
| 2017/0310417 A1 | 10/2017 | Jung et al. | |
| 2017/0331573 A1 | 11/2017 | Li | |
| 2018/0048348 A1 | 2/2018 | Gau et al. | |
| 2018/0049190 A1 | 2/2018 | Abedini et al. | |
| 2018/0070274 A1 | 3/2018 | Ode | |
| 2018/0070335 A1 | 3/2018 | Amuru et al. | |
| 2018/0077685 A1 | 3/2018 | Wu et al. | |
| 2018/0115386 A1 | 4/2018 | Shin et al. | |
| 2018/0123765 A1 | 5/2018 | Cao et al. | |
| 2018/0124684 A1 | 5/2018 | Kwon et al. | |
| 2018/0139774 A1 | 5/2018 | Ma et al. | |
| 2018/0145797 A1 | 5/2018 | Yeo et al. | |
| 2018/0152907 A1 | 5/2018 | Zhang et al. | |
| 2018/0167932 A1 | 6/2018 | Papasakellariou | |
| 2018/0199359 A1 | 7/2018 | Cao et al. | |
| 2018/0302191 A1 | 10/2018 | Park et al. | |
| 2018/0337816 A1 | 11/2018 | Herath et al. | |
| 2019/0045489 A1 | 2/2019 | He et al. | |
| 2019/0053226 A1 | 2/2019 | Xiong et al. | |
| 2019/0081657 A1 | 3/2019 | Zeng et al. | |
| 2019/0082456 A1 | 3/2019 | Kim et al. | |
| 2019/0132076 A1 | 5/2019 | Cheng et al. | |
| 2019/0158338 A1 | 5/2019 | Herath et al. | |
| 2019/0174472 A1 | 6/2019 | Lee et al. | |
| 2019/0190753 A1 | 6/2019 | Bayesteh et al. | |
| 2019/0289628 A1 | 9/2019 | Xiong et al. | |
| 2019/0312694 A1 | 10/2019 | Jia et al. | |
| 2019/0313402 A1 | 10/2019 | Lei et al. | |
| 2019/0363846 A1 | 11/2019 | Lei et al. | |
| 2019/0386783 A1 | 12/2019 | Chou | |
| 2020/0014457 A1 | 1/2020 | Tang | |
| 2020/0059322 A1 | 2/2020 | Lei et al. | |
| 2020/0077402 A1 | 3/2020 | Lei et al. | |
| 2020/0092057 A1 | 3/2020 | Herath et al. | |
| 2020/0119958 A1 | 4/2020 | Bayesteh et al. | |
| 2020/0154442 A1 | 5/2020 | Zhou | |
| 2020/0154481 A1 | 5/2020 | Goto et al. | |
| 2020/0196335 A1 | 6/2020 | Lei et al. | |
| 2020/0213901 A1 | 7/2020 | Yoshimoto et al. | |
| 2020/0404634 A1 | 12/2020 | He et al. | |
| 2021/0029693 A1 | 1/2021 | Meng | |
| 2021/0045181 A1 | 2/2021 | Li et al. | |
| 2021/0135825 A1* | 5/2021 | Pan | H04W 72/02 |
| 2021/0203465 A1 | 7/2021 | Meng et al. | |
| 2021/0266124 A1 | 8/2021 | Wu et al. | |
| 2021/0307003 A1 | 9/2021 | Chou | |

FOREIGN PATENT DOCUMENTS

| | | |
|---|---|---|
| WO | 2017050760 | 3/2017 |
| WO | 2017055271 | 4/2017 |
| WO | 201702950 | 6/2017 |
| WO | 2017167198 | 10/2017 |
| WO | 2017194001 | 11/2017 |
| WO | 2017209570 | 12/2017 |
| WO | 2017212104 | 12/2017 |
| WO | 2018021819 | 2/2018 |
| WO | 2018031620 | 2/2018 |
| WO | 2018031770 | 2/2018 |
| WO | 2018032014 | 2/2018 |
| WO | 2018038410 | 3/2018 |
| WO | 2018061572 | 4/2018 |
| WO | 2018062842 | 4/2018 |
| WO | 2018062976 | 4/2018 |
| WO | 2018064582 | 4/2018 |
| WO | 2018084559 | 5/2018 |
| WO | 2018085045 | 5/2018 |
| WO | 2018128200 | 7/2018 |
| WO | 2018130115 | 7/2018 |
| WO | 2018174649 | 9/2018 |
| WO | 2019240887 | 12/2019 |
| WO | 2019240903 | 12/2019 |
| WO | 2019245662 | 12/2019 |
| WO | 2019246429 | 12/2019 |
| WO | 2020033434 | 2/2020 |
| WO | 2020069090 | 4/2020 |

OTHER PUBLICATIONS

"International Preliminary Report on Patentability", PCT Application No. PCT/US2019/053105, dated Apr. 8, 2021, 9 pages.
"Notice of Allowance", U.S. Appl. No. 16/387,000, dated Mar. 31, 2021, 8 pages.
"International Preliminary Report on Patentability", Application No. PCT/US2019/045346, dated Nov. 13, 2020, 12 pages.
"International Preliminary Report on Patentability", Application No. PCT/US2019/029691, dated Dec. 15, 2020, 7 pages.
"International Preliminary Report on Patentability", Application No. PCT/US2019/032285, dated Dec. 15, 2020, 7 pages.
"International Preliminary Report on Patentability", Application No. PCT/US2019/031059, dated Dec. 22, 2020, 11 pages.
"International Preliminary Report on Patentability", Application No. PCT/US2019/038295, dated Dec. 22, 2020, 8 pages.
"Procedures related consideration to NoMA", 3GPP TSG RAN WG1 Meeting #92bis—R1-1804398, Apr. 2018, 6 pages.
"Status Report to TSG", 3GPP TSG RAN meeting #77—RP-172105, Sep. 2017, 4 pages.
Georgakopoulos, et al., "Preliminary results on multi-antenna access and link enhancements", Jun. 1, 2017, 120 pages.
"3rd Generation Partnership Project; Technical Specification Group Radio Access Network; Evolved Universal Terrestrial Radio Access (E-UTRA) and NR; Multi-connectivity; Stage 2 (Release 15)", 3GPP TS 37.340 V0.0.0, Jun. 2017, 8 Pages.
"3rd Generation Partnership Project; Technical Specification Group Radio Access Network; NG-RAN; Architecture description (Release 15)", 3GPP TS 38.401 V15.0.0, Dec. 2017, 9 Pages.
"3rd Generation Partnership Project; Technical Specification Group Radio Access Network; NG-RAN; Xn application protocol (XnAP) (Release 15)", 3GPP TS 38.423 V1.0.0, Jun. 2018, 9 Pages.
"3rd Generation Partnership Project; Technical Specification Group Radio Access Network; NR; Multiplexing and channel coding (Release 15)", 3GPP TS 38.212 V15.2.0, Jun. 2018, 105 pages.
"3rd Generation Partnership Project; Technical Specification Group Radio Access Network; NR; NR and NG-RAN Overall Description; Stage 2 (Release 15)", 3GPP TS 38.300 V15.0.0, Dec. 2017, 68 Pages.

(56) References Cited

OTHER PUBLICATIONS

"3rd Generation Partnership Project; Technical Specification Group Radio Access Network; NR; Physical channels and modulation (Release 15)", 3GPP TS 38.211 V15.2.0, Jun. 2018, 46 pages.
"3rd Generation Partnership Project; Technical Specification Group Radio Access Network; NR; Physical layer procedures for control (Release 15)", 3GPP TS 38.213 V15.2.0, Jun. 2018, 49 pages.
"3rd Generation Partnership Project; Technical Specification Group Radio Access Network; NR; Physical layer procedures for data (Release 15)", 3GPP TS 38.214 V15.2.0, Jun. 2018, 95 pages.
"3rd Generation Partnership Project; Technical Specification Group Radio Access Network; NR; Radio Resource Control (RRC); Protocol specification (Release 15)", 3GPP TS 38.331 V0.0.1, Mar. 2017, 13 Pages.
"3rd Generation Partnership Project; Technical Specification Group Radio Access Network; Study on Integrated Access and Backhaul; (Release 15)", 3GPP TR 38.874 V0.2.1, May 2018, 19 Pages.
"Considerations on Link Rate Adaptation for NOMA", 3GPP TSG RAN WG1 Meeting #93, Busan, Korea, May 2018, 4 pages.
"Considerations on NOMA Procedures", 3GPP TSG RAN WG1 Meeting #93, Busan, Korea, May 2018, 3 pages.
"CU-DU Interface: Overall Categorization of C-Plane and U-Plane", TSG-RAN Working Group 3 meeting #95, Athens, Greece, Feb. 13-17, 2017, 9 pages.
"Discussion on Categorization of MA Schemes and Target Scenarios", 3GPP TSG RAN WG1 Meeting #86, Gothenburg, Sweden, Aug. 2016, 3 pages.
"Discussion on NOMA Procedure", 3GPP TSG RAN WG1 Meeing #93, Busan, Korea, May 2018, 4 pages.
"Discussion on NOMA Procedures", 3GPP TSG RAN WG1 Meeting #92bis, Sanya, China, Feb. 2018, 4 pages.
"Discussion on Receivers for NoMA", 3GPP TSG RAN WG1 #92 Meeting, Athens, Greece, Feb. 2018, 5 Pages.
"F1 Interface: Radio Resource Configuration Management", TSG-RAN Working Group 3 meeting #96, Hangzhou, China, May 15-19, 2017, 4 pages.
"Final Office Action", U.S. Appl. No. 16/387,000, dated Nov. 24, 2020, 13 pages.
"Final Report of 3GPP TSG RAN WG1 #86bis v1.0.0", Final Report of 3GPP TSG RAN WG1 #86bis v1.0.0, (Lisbon, Portugal), Oct. 2016, 160 pages.
"Final Report of 3GPP TSG RAN WG1 #92bis v1.0.0 AN WG1 #92bis v1.0.0", Final Report of 3GPP TSG RAN WG1 #92bis v1.0.0, (Sanya, China), Apr. 2018, 195 pages.
"Grant-Free UL Transmissions in NR", 3GPP TSG-RAN WG1 #86bis, Lisbon, Portugal, Oct. 2016, 8 pages.
"Grant-less and Non-orthogonal UL Transmissions in NR", 3GPP TSG-RAN WG1 #86, Gothenburg, Sweden, Aug. 22-26, 2016, 5 pages.
"International Search Report and Written Opinion", PCT Application No. PCT/US2019/045346, dated Oct. 17, 2019, 17 pages.
"International Search Report and Written Opinion", PCT Application No. PCT/US2019/053105, dated Dec. 10, 2019, 17 pages.
"International Search Report and Written Opinion", PCT Application No. PCT/US2019/029691, dated Jul. 19, 2019, 12 pages.
"International Search Report and Written Opinion", PCT Application No. PCT/US2019/032285, dated Aug. 14, 2019, 85 pages.
"International Search Report and Written Opinion", PCT Application No. PCT/US2019/031059, dated Aug. 19, 2019, 16 pages.
"International Search Report and Written Opinion", PCT Application No. PCT/US2019/038295, dated Sep. 4, 2019, 14 pages.
"Key Processing Modules at Transmitter Side for NOMA", 3GPP TSG RAN WG1 Meeting #93, Busan, Korea, May 2018, 11 pages.
"LTE; Evolved Universal Terrestrial Radio Access (E-UTRA); Medium Access Control (MAC) protocol specification (3GPP TS 36.321 version 15.8.0 Release 15)", ETSI TS 136 321 V15.8.0, Jan. 2020, 137 pages.
"NOMA Related Procedure", 3GPP TSG RAN WG1 Meeting #93, Busan, Korea, May 2018, 8 pages.
"Non-Final Office Action", U.S. Appl. No. 16/387,000, dated Jun. 4, 2020, 10 Pages.
"Non-Final Office Action", U.S. Appl. No. 16/427,712, dated Nov. 4, 2020, 17 pages.
"On Categorization of MA Schemes for NR", 3GPP TSG-RAN WG1 Meeting #86, Gothenburg, Sweden, Aug. 2016, 2 pages.
"Receivers for NOMA", 3GPP TSG RAN WG1 Meeting #92, Athens, Greece, Feb. 2018, 8 Pages.
"Summary of [86-18] Email Discussion on Categorization for NR MA Schemes", 3GPP TSG RAN WG1 Meeting #86bis, Lisbon, Portugal, Oct. 10-14, 2016, Oct. 2016, 7 pages.
"Technical Specification Group Radio Access Network; NG-RAN; F1 application protocol (F1AP) (Release 15)", 3GPP TS 38.473 V15.0.0, Dec. 2017, 9 Pages.
"Typical multi-user receivers for NOMA", 3GPP TSG RAN WG1 Meeting #92, Athens, Greece, Feb. 26-Mar. 2, 2018, Feb. 2018, 14 Pages.
"UE Overheating for EN-DC", 3GPP R2-1802414, UE overheating for EN-DC, in 3GPP TSG-RAN WG2 Meeting #101, Apple Inc., Mar. 2, 2018, 3 pages.
"WF on UL Multiple Access Scheme Categorization for mMTC", 3GPP TSG RAN WG1 #86, Gothenburg, Sweden, Aug. 2016, 3 pages.
"Written Opinion", PCT Application No. PCT/US2019/045346, dated Jun. 22, 2020, 7 pages.
Klingenbrunn, et al., "Power Backoff Mechanism for Intermodulation Distortion and Harmonic Distortion", Technical Disclosure Commons; Retrieved from https://www.tdcommons.org/dpubs_series/3424, Jul. 13, 2020, 13 pages.
Wu, "Handling Overheating in a Wireless-Communication Device", Technical Disclosure Commons; Retrieved from https://www.tdcommons.org/dpubs_series/2343, Jul. 12, 2019, 22 pages.
Yuan, et al., "Blind Multi-User Detection for Autonomous Grant-Free High-Overloading MA Without Reference Signal", ZTE Corporation, South Keji Road, 55, Shenzhen, China, 508118, Dec. 7, 2017, 13 pages.
Yuan, "NOMA Study in 3GPP for 5G", ISTC 2018, Hong Kong, Dec. 2018, 32 pages.
"Extended European Search Report", EP Application No. 22159471.6, dated May 24, 2022, 9 pages.
"Notice of Allowance", U.S. Appl. No. 17/042,792, dated Apr. 12, 2022, 12 pages.
"Notice of Allowance", U.S. Appl. No. 17/260,862, dated May 26, 2022, 8 pages.

* cited by examiner

BEAMFORMING-BASED GRANT-FREE NON-ORTHOGONAL MULTIPLE ACCESS TRANSMISSION

BACKGROUND

The evolution of wireless communication to fifth generation (5G) standards and technologies provides higher data rates and greater capacity, with improved reliability and lower latency, which enhances mobile broadband services. 5G technologies also provide new classes of services for vehicular networking, fixed wireless broadband, and the Internet of Things (IoT). Fifth generation new radio (5G NR) standards and systems are designed to support three major deployment scenarios: enhanced mobile broadband (eMBB), ultra-reliable low latency communications (URLLC), and massive machine type communications (mMTC).

For mMTC applications, a base station is expected to accommodate a very large number of low-cost user equipment. The data traffic generated by each mMTC user equipment (UE) is expected to be both light and sporadic. The signaling overhead and wireless network traffic of the scheduling grants associated with each uplink transmission in conventional wireless communication system is inefficient for mMTC UEs and applications.

SUMMARY

This summary is provided to introduce simplified concepts of beamforming-based grant-free non-orthogonal multiple access transmission. The simplified concepts are further described below in the Detailed Description. This summary is not intended to identify essential features of the claimed subject matter, nor is it intended for use in determining the scope of the claimed subject matter.

In some aspects, configuring beamformed wireless communication between a base station and a user equipment is described, in which the base station transmits, using multiple transmit antenna configurations, downlink reference signals to the user equipment, configures time-frequency resources for Non-Orthogonal Multiple Access (NOMA) transmission by the user equipment, and configures an association between the downlink reference signals and the time-frequency resources for the user equipment. The base station transmits the configuration of the time-frequency resources and the association between the downlink reference signals and the time-frequency resources to the user equipment. The base station receives uplink data from the user equipment on one of the time-frequency resources using a receive antenna configuration, the receive antenna configuration being determined at least in part using one of the multiple transmit antenna configurations used for transmitting one of the downlink reference signals associated with the one of the time-frequency resources as indicated in the association.

In other aspects, beamformed communication between a base station and a user equipment is described, in which the user equipment receives, using multiple receive antenna configurations, downlink reference signals from the base station, receives a configuration of time-frequency resources for Non-Orthogonal Multiple Access (NOMA) transmission from the base station, and receives an association between the downlink reference signals and the time-frequency resources from the base station. The user equipment transmits uplink data to the base station on one of the time-frequency resources using a transmit antenna configuration, the transmit antenna configuration being determined, at least in part, using one of the multiple receive antenna configurations used for receiving one of the downlink reference signals which is associated with the one of the time-frequency resources as indicated in the association.

BRIEF DESCRIPTION OF THE DRAWINGS

Aspects of beamforming-based grant-free non-orthogonal multiple access transmission are described with reference to the following drawings. The same numbers are used throughout the drawings to reference like features and components.

DETAILED DESCRIPTION

In aspects of grant-free uplink (UL) transmission, user devices perform uplink transmissions autonomously without the transmissions being scheduled by a base station. The base station receives the uplink transmissions using a predefined detection and/or decoding method. The use of grant-free transmissions is particularly suited to the low-duty cycle and/or sporadic communication needs of massive machine type communications (mMTC) user equipment, systems, and applications. The benefits of grant-free uplink transmissions are also applicable to many ultra-reliable low latency communications (URLLC) user equipment, systems, and applications. Grant-free uplink transmissions may also be applied in a unified framework for all fifth generation new radio (5G NR) user equipment, systems, base stations, and application scenarios.

Within the context of grant-free uplink transmissions, non-orthogonal multiple access (NOMA) can be utilized as a multiple access scheme. In NOMA, the user equipment performs grant-free uplink transmissions with resources that are not necessarily orthogonal to each other. A resource used by a user equipment for NOMA transmission is typically described as a multiple access (MA) signature (e.g., orthogonal codes, spreading codes, scrambling codes, mapping patterns, etc.). A larger number of user equipment can be simultaneously supported using NOMA than can be supported using orthogonal resources. For uplink detection, the base station blindly decodes all the possible MA signatures since uplink transmissions are not pre-scheduled but are made autonomously by the UEs. To lower decoding complexity, the MA signatures can be associated with preambles and/or demodulation reference symbols that are based on a predefined mapping mechanism. For example, if preambles and MA signatures have a one-to-one mapping, the base station can simply detect the presence of a particular preamble to see if the associated user equipment made an uplink transmission instead of decoding an entire uplink transmission of a user equipment to detect the identity of the user equipment.

In 5G NR systems, beamforming is expected to be heavily utilized to overcome signal attenuation in higher-frequency radio bands. A transmit-receive beam refers to signals generated by applying a specific transmit-receive antenna configuration in a multi-antenna communication device. The transmit-receive beam comprises a specific pattern of spatial filtering that is applied to output signals for transmission. In the case of digital beamforming, the spatial filtering is performed in the radio baseband and can be done by applying weighting coefficients to the complex baseband signal values. With increasing numbers of antenna elements, the cost of performing beamforming in the baseband also increases. Analog beamforming, on the other hand, performs spatial filtering on the radio frequency (RF) signals directly, and can be achieved by adjusting the transmission or reception timing of the RF signals on different antenna elements. For example, the timing adjustment is achieved by coupling a phase shifter to each antenna element. Conceptually, a transmit-receive beam can be thought of as applying a specific setting to the array of phase shifters.

In this document, a transmit antenna configuration refers to a specific transmit beam pattern. Similarly, a receive antenna configuration refers to a specific receive beam pattern.

Beam sweeping is an operation where different spatial filtering patterns are applied continuously in the time domain to cover different spatial directions in analog beamforming. Transmit beam sweeping is a process where a communication device transmits the same signal in consecutive time slots using different transmit beams. Similarly, receive beam sweeping is the process where a device receives the same signal in consecutive time slots using different receive beams.

Beam correspondence between transmit beams and receive beams at a base station can be achieved if at least one of the following is satisfied:
 a. The base station is able to determine a receive beam for uplink reception based on downlink (DL) measurement of one or more base station transmit beams made by the user equipment, or
 b. The base station is able to determine a transmit beam for the downlink transmission based on the base station's uplink measurement of one or more base station receive beams.

Similarly, beam correspondence between transmit beams and receive beams at a user equipment can be achieved if at least one of the following is satisfied:
 a. The user equipment is able to determine a user equipment transmit beam for the uplink transmission based on the user equipment's downlink measurement of one or more user equipment receive beams, or
 b. The user equipment is able to determine a user equipment receive beam for downlink reception based on an indication from the base station that is based on uplink measurement of one or more user equipment transmit beams.

In 5G NR systems, signals used for initial access to the wireless network by the user equipment include several synchronization signal blocks (SSBs). An SSB includes a primary synchronization signal, a secondary synchronization signal, and a physical broadcast channel (PBCH). A DL reference signal (RS) is a special signal transmitted by the base station on a regular (e.g., periodic) basis for measurement and reporting purposes by the UE. In 5G NR systems, channel state information-reference signals (CSI-RSs) and/or SSBs can serve as the downlink reference signals (DL RSs).

Example Environment

Figure 1:
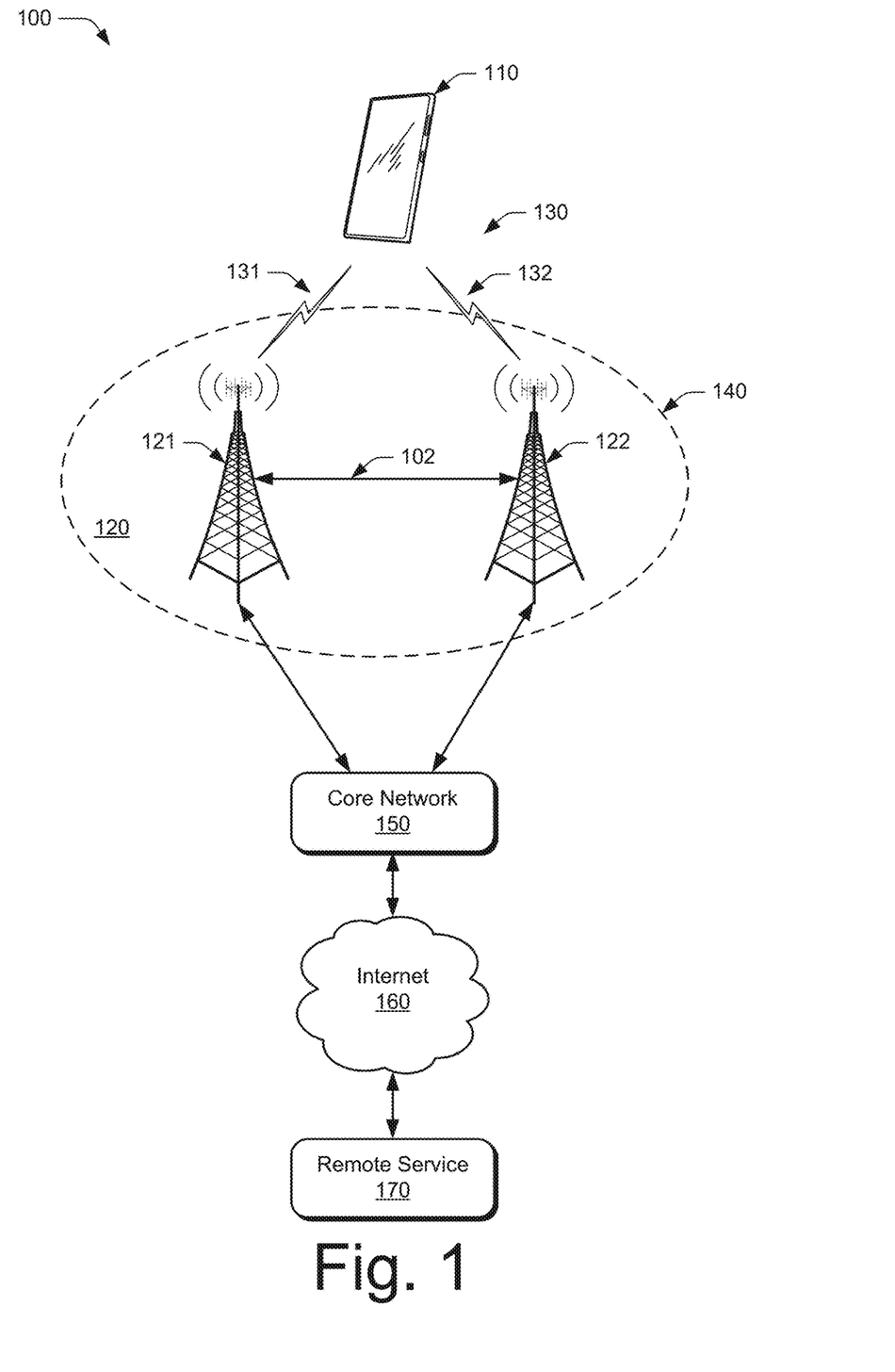
FIG. 1 illustrates an example wireless network environment in which various aspects of beamforming-based grant-free non-orthogonal multiple access transmission can be implemented.

FIG. 1 illustrates an example environment 100 which includes a user equipment 110 (UE 110) that can communicate with base stations 120 (illustrated as base stations 121 and 122) through wireless communication links 130 (wireless link 130), illustrated as wireless links 131 and 132. For simplicity, the UE 110 is implemented as a smartphone but may be implemented as any suitable computing or electronic device, such as a mobile communication device, modem, cellular phone, gaming device, navigation device, media device, laptop computer, desktop computer, tablet computer, smart appliance, vehicle-based communication system, or an Internet-of-Things (IoT) device such as a sensor or an actuator. The base stations 120 (e.g., an Evolved Universal Terrestrial Radio Access Network Node B, E-UTRAN Node B, evolved Node B, eNodeB, eNB, Next Generation Node B, gNode B, gNB, or the like) may be implemented in a macrocell, microcell, small cell, picocell, and the like, or any combination thereof.

The base stations 120 communicate with the user equipment 110 using the wireless links 131 and 132, which may be implemented as any suitable type of wireless link. The wireless links 131 and 132 include control and data communication, such as downlink of data and control information communicated from the base stations 120 to the user equipment 110, uplink of other data and control information communicated from the user equipment 110 to the base stations 120, or both. The wireless links 130 may include one or more wireless links (e.g., radio links) or bearers implemented using any suitable communication protocol or standard, or combination of communication protocols or standards, such as 3rd Generation Partnership Project Long-Term Evolution (3GPP LTE), Fifth Generation New Radio (5G NR), and so forth. Multiple wireless links 130 may be aggregated in a carrier aggregation to provide a higher data rate for the UE 110. Multiple wireless links 130 from multiple base stations 120 may be configured for Coordinated Multipoint (CoMP) communication with the UE 110.

The base stations 120 are collectively a Radio Access Network 140 (e.g., RAN, Evolved Universal Terrestrial Radio Access Network, E-UTRAN, 5G NR RAN or NR RAN). The base stations 121 and 122 in the RAN 140 are connected to a core network 150. The base stations 121 and 122 connect, at 102 and 104 respectively, to the core network 150 through an NG2 interface for control-plane signaling and using an NG3 interface for user-plane data communications when connecting to a 5G core network, or using an Si interface for control-plane signaling and user-plane data communications when connecting to an Evolved Packet Core (EPC) network. The base stations 121 and 122 can communicate using an Xn Application Protocol (XnAP) through an Xn interface, or using an X2 Application Protocol (X2AP) through an X2 interface, at 106, to exchange user-plane and control-plane data. The user equipment 110 may connect, via the core network 150, to public networks, such as the Internet 160 to interact with a remote service 170.

Figure 2:
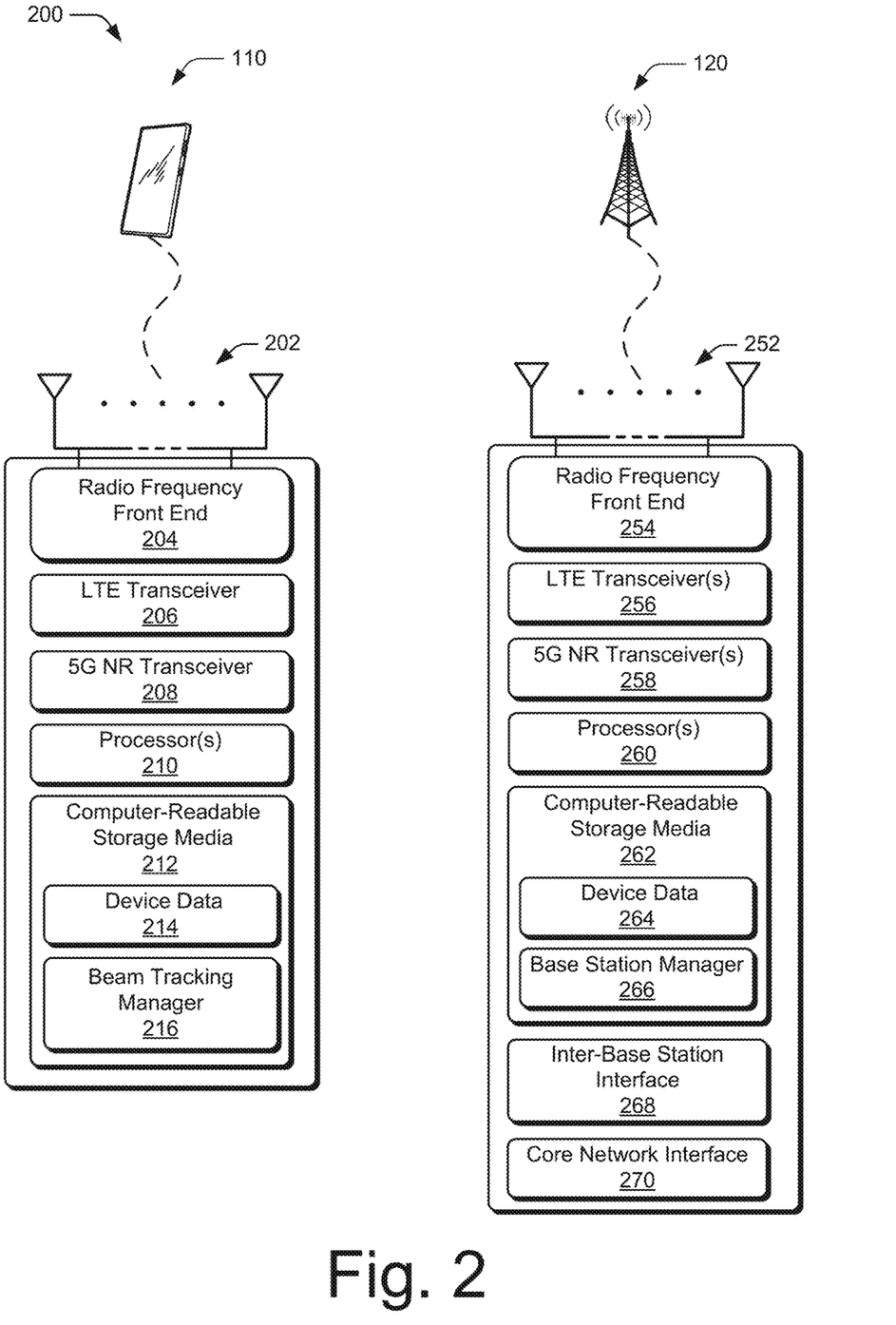
FIG. 2 illustrates an example device diagram that can implement various aspects of beamforming-based grant-free non-orthogonal multiple access transmission.

FIG. 2 illustrates an example device diagram 200 of the user equipment 110 and the base stations 120. The user equipment 110 and the base stations 120 may include additional functions and interfaces that are omitted from FIG. 2 for the sake of clarity. The user equipment 110 includes antennas 202, a radio frequency front end 204 (RF front end 204), an LTE transceiver 206, and a 5G NR transceiver 208 for communicating with base stations 120 in the RAN 140. The RF front end 204 of the user equipment 110 can couple or connect the LTE transceiver 206, and the 5G NR transceiver 208 to the antennas 202 to facilitate various types of wireless communication. The antennas 202 of the user equipment 110 may include an array of multiple antennas that are configured similar to or differently from each other. The antennas 202 and the RF front end 204 can be tuned to, and/or be tunable to, one or more frequency bands defined by the 3GPP LTE and 5G NR communication standards and implemented by the LTE transceiver 206, and/or the 5G NR transceiver 208. Additionally, the antennas 202, the RF front end 204, the LTE transceiver 206, and/or the 5G NR transceiver 208 may be configured to support beamforming for the transmission and reception of communications with the base stations 120. By way of example and not limitation, the antennas 202 and the RF front end 204 can be implemented for operation in sub-gigahertz bands, sub-6 GHZ bands, and/or above 6 GHz bands that are defined by the 3GPP LTE and 5G NR communication standards.

The user equipment 110 also includes processor(s) 210 and computer-readable storage media 212 (CRM 212). The processor 210 may be a single core processor or a multiple core processor composed of a variety of materials, such as silicon, polysilicon, high-K dielectric, copper, and so on. The computer-readable storage media described herein excludes propagating signals. CRM 212 may include any suitable memory or storage device such as random-access memory (RAM), static RAM (SRAM), dynamic RAM (DRAM), non-volatile RAM (NVRAM), read-only memory (ROM), or Flash memory useable to store device data 214 of the user equipment 110. The device data 214 includes user data, multimedia data, beamforming codebooks, applications, and/or an operating system of the user equipment 110, which are executable by processor(s) 210 to enable user-plane communication, control-plane signaling, and user interaction with the user equipment 110.

In some implementations, the CRM 212 may also include a beam tracking manager 216. Alternately or additionally, the beam tracking manager 216 may be implemented in whole or part as hardware logic or circuitry integrated with or separate from other components of the user equipment 110. The beam tracking manager 216 can communicate with the antennas 202, the RF front end 204, the LTE transceiver 206, and/or the 5G NR transceiver 208 to monitor the quality of the wireless communication links 130 and initiate a beam search based on the monitored quality of the wireless communication links 130.

The device diagram for the base stations 120, shown in FIG. 2, includes a single network node (e.g., a gNode B). The functionality of the base stations 120 may be distributed across multiple network nodes or devices and may be distributed in any fashion suitable to perform the functions described herein. The base stations 120 include antennas 252, a radio frequency front end 254 (RF front end 254), one or more LTE transceivers 256, and/or one or more 5G NR transceivers 258 for communicating with the UE 110. The RF front end 254 of the base stations 120 can couple or connect the LTE transceivers 256 and the 5G NR transceivers 258 to the antennas 252 to facilitate various types of wireless communication. The antennas 252 of the base stations 120 may include an array of multiple antennas that are configured similar to or differently from each other. The antennas 252 and the RF front end 254 can be tuned to, and/or be tunable to, one or more frequency band defined by the 3GPP LTE and 5G NR communication standards, and implemented by the LTE transceivers 256, and/or the 5G NR transceivers 258. Additionally, the antennas 252, the RF front end 254, the LTE transceivers 256, and/or the 5G NR transceivers 258 may be configured to support beamforming, such as Massive-MIMO, for the transmission and reception of communications with the UE 110.

The base stations 120 also include processor(s) 260 and computer-readable storage media 262 (CRM 262). The processor 260 may be a single core processor or a multiple core processor composed of a variety of materials, such as silicon, polysilicon, high-K dielectric, copper, and so on. CRM 262 may include any suitable memory or storage device such as random-access memory (RAM), static RAM (SRAM), dynamic RAM (DRAM), non-volatile RAM (NVRAM), read-only memory (ROM), or Flash memory useable to store device data 264 of the base stations 120. The device data 264 includes network scheduling data, radio resource management data, beamforming codebooks, applications, and/or an operating system of the base stations 120, which are executable by processor(s) 260 to enable communication with the user equipment 110.

CRM 262 also includes a resource manager 266. Alternately or additionally, the resource manager 266 may be implemented in whole or part as hardware logic or circuitry integrated with or separate from other components of the base stations 120. In at least some aspects, the resource manager 266 configures the LTE transceivers 256 and the 5G NR transceivers 258 for communication with the user equipment 110, as well as communication with a core network, such as the core network 150.

The base stations 120 include an inter-base station interface 268, such as an Xn and/or X2 interface, which the resource manager 266 configures to exchange user-plane and control-plane data between other base stations 120, to manage the communication of the base stations 120 with the user equipment 110. The base stations 120 include a core network interface 270 that the resource manager 266 configures to exchange user-plane and control-plane data with core network functions and/or entities.

Beamforming-Based Grant-Free NOMA Transmission

When operating in higher-frequency radio bands, beamforming is applied at both the transmitting and the receiving end of a wireless communication link to extend the communication range (distance). Appropriate beamforming weights are established and maintained after a user equipment 110 enters an RRC_CONNECTED state and through a series of related signaling communications. As a grant-free (GF) NOMA transmission is made autonomously by a user equipment 110, and the user equipment 110 may be in a state other than the RRC_CONNECTED state, how the user equipment 110 determines the appropriate transmit beam for transmissions to the base station 121 has not been defined. How the base station 121 determines the appropriate receive beam for receiving uplink NOMA transmission from the user equipment 110 is also undefined.

In aspects, to provide transmit beam determination for the user equipment 110, as well as receive beam determination for the base station 121, the base station 121 transmits multiple DL RSs, with each DL RS applying spatial filtering patterns to transmit on different transmit beams. The base station 121 then configures time-frequency resources dedicated to NOMA transmission by the user equipment 110.

The base station 121 further configures an association between the multiple DL RSs and the time-frequency resources, such that each DL RS has an associated time-frequency resource. Optionally or additionally, MA signatures can be associated with preambles and/or demodulation reference symbols that are based on a predefined mapping mechanism, as described above.

Before attempting to perform a NOMA transmission, the user equipment 110 receives the DL RSs. By receiving the DL RSs, the user equipment 110 determines which one of the DL RSs yields the best reception quality (e.g., the highest reference signal received power (RSRP)). Also, the user equipment 110 determines a receive beam for reception of the DL RSs based on measurements of downlink transmissions received by the user equipment 110. Using the association indicated by the base station 121, the user equipment 110 determines one of the time-frequency resources which is associated with the one of the DL RSs. Finally, the user equipment 110 applies the principle of beam correspondence, as described above and performs a NOMA transmission on the one of the time-frequency resources using a transmit beam which is determined based on at least the receive beam used to receive the one of the DL RSs.

In another aspect, the base station 121 attempts to detect uplink NOMA transmissions on each of the time-frequency resources. When detecting a particular time-frequency resource, the base station 121 first determines a DL RS which is associated with the particular time-frequency resource based on the association relationship. Applying the principle of beam correspondence, the base station 121 then determines a receive beam based on at least the transmit beam which is used for transmitting the DL RS. Optionally or additionally, if MA signatures are associated with preambles and/or demodulation reference symbols, the base station 121 can simply detect the presence of a particular preamble to see if the associated user equipment 110 made an uplink transmission instead of decoding an entire uplink transmission of a user equipment 110 to detect the identity of the user equipment.

In a further aspect, the time-frequency resources can also be associated with the DL RSs in an indirect fashion. For example, the base station 121 can configure an association between the DL RSs and multiple Physical Random Access Channel (PRACH) resources and configure another association between the time-frequency resources used for NOMA transmissions with the PRACH resources.

Figure 3:
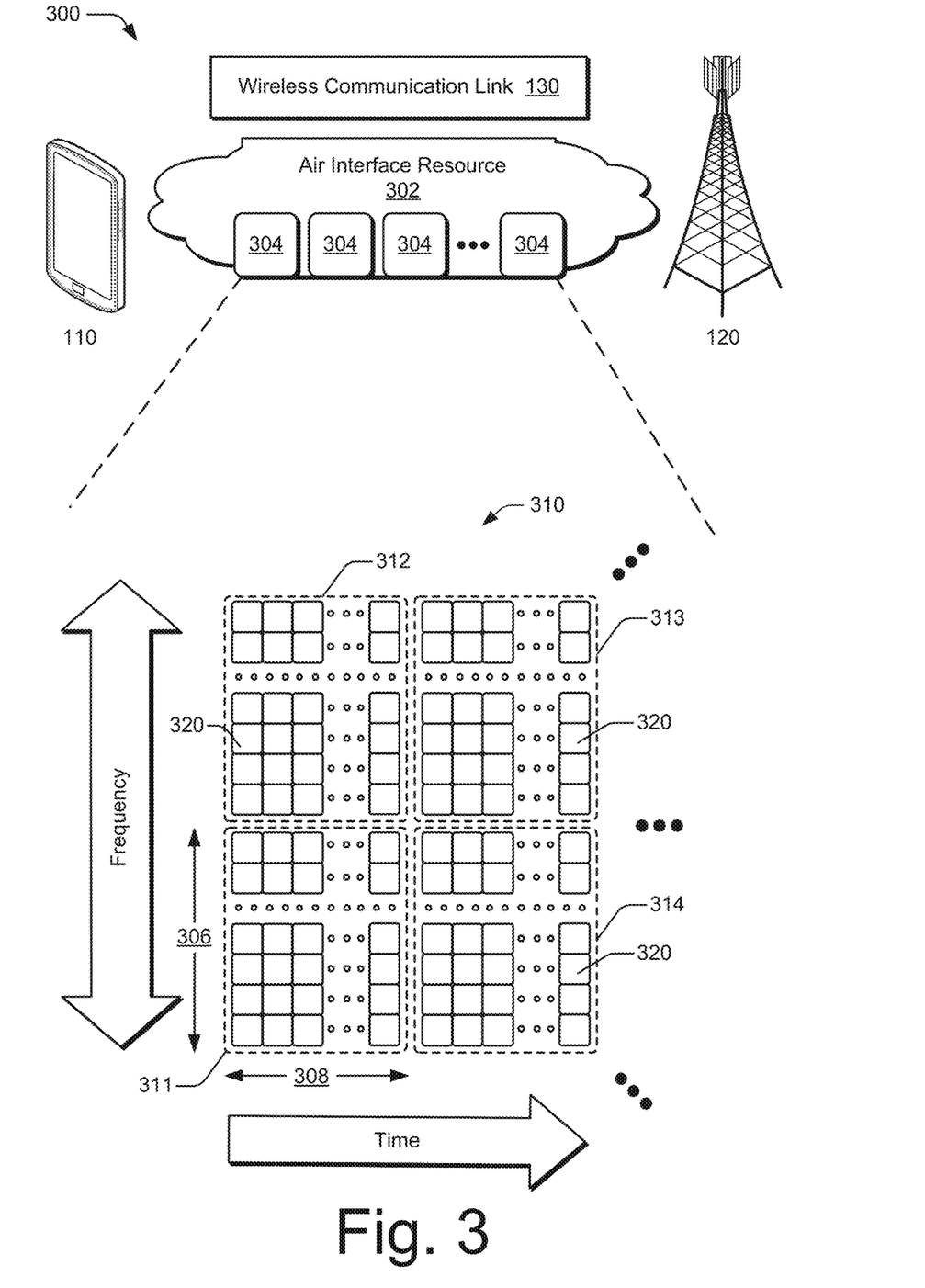
FIG. 3 illustrates an air interface resource that extends between a user equipment and a base station and with which various aspects of beamforming-based grant-free non-orthogonal multiple access transmission techniques can be implemented.

FIG. 3 illustrates an air interface resource that extends between a user equipment and a base station and with which various aspects of user equipment-initiated beam search for fifth generation new radio can be implemented. The air interface resource 302 can be divided into resource units 304, each of which occupies some intersection of frequency spectrum and elapsed time. A portion of the air interface resource 302 is illustrated graphically in a grid or matrix having multiple resource blocks 310, including example resource blocks 311, 312, 313, 314. An example of a resource unit 304 therefore includes at least one resource block 310. As shown, time is depicted along the horizontal dimension as the abscissa axis, and frequency is depicted along the vertical dimension as the ordinate axis. The air interface resource 302, as defined by a given communication protocol or standard, may span any suitable specified frequency range, and/or may be divided into intervals of any specified duration. Increments of time can correspond to, for example, milliseconds (mSec). Increments of frequency can correspond to, for example, megahertz (MHz).

In example operations generally, the base stations 120 allocate portions (e.g., resource units 304) of the air interface resource 302 for uplink and downlink communications. Each resource block 310 of network access resources may be allocated to support respective wireless communication links 130 of multiple user equipment 110. In the lower left corner of the grid, the resource block 311 may span, as defined by a given communication protocol, a specified frequency range 306 and comprise multiple subcarriers or frequency sub-bands. The resource block 311 may include any suitable number of subcarriers (e.g., 12) that each correspond to a respective portion (e.g., 15 kHz) of the specified frequency range 306 (e.g., 180 kHz). The resource block 311 may also span, as defined by the given communication protocol, a specified time interval 308 or time slot (e.g., lasting approximately one-half millisecond or 7 orthogonal frequency-division multiplexing (OFDM) symbols). The time interval 308 includes subintervals that may each correspond to a symbol, such as an OFDM symbol. As shown in FIG. 3, each resource block 310 may include multiple resource elements 320 (REs) that correspond to, or are defined by, a subcarrier of the frequency range 306 and a subinterval (or symbol) of the time interval 308. Alternatively, a given resource element 320 may span more than one frequency subcarrier or symbol. Thus, a resource unit 304 may include at least one resource block 310, at least one resource element 320, and so forth.

In example implementations, multiple user equipment 110 (one of which is shown) are communicating with the base stations 120 (one of which is shown) through access provided by portions of the air interface resource 302. The resource manager 266 (shown in FIG. 2) may determine a respective data-rate, type of information, or amount of information (e.g., data or control information) to be communicated (e.g., transmitted) by the user equipment 110. For example, the resource manager 266 can determine that each user equipment 110 is to transmit at a different respective data rate or transmit a different respective amount of information. The resource manager 266 then allocates one or more resource blocks 310 to each user equipment 110 based on the determined data rate or amount of information.

Additionally or in the alternative to block-level resource grants, the resource manager 266 may allocate resource units at an element-level. Thus, the resource manager 266 may allocate one or more resource elements 320 or individual subcarriers to different user equipment 110. By so doing, one resource block 310 can be allocated to facilitate network access for multiple user equipment 110. Accordingly, the resource manager 266 may allocate, at various granularities, one or up to all subcarriers or resource elements 320 of a resource block 310 to one user equipment 110 or divided across multiple user equipment 110, thereby enabling higher network utilization or increased spectrum efficiency.

The resource manager 266 can therefore allocate air interface resource 302 by resource unit 304, resource block 310, frequency carrier, time interval, resource element 320, frequency subcarrier, time subinterval, symbol, spreading code, some combination thereof, and so forth. Based on respective allocations of resource units 304, the resource manager 266 can transmit respective messages to the multiple user equipment 110 indicating the respective allocation of resource units 304 to each user equipment 110. Each message may enable a respective user equipment 110 to queue the information or configure the LTE transceiver 206, the 5G NR transceiver 208, or both to communicate via the allocated resource units 304 of the air interface resource 302.

Example Methods

Example methods 400 and 500 are described with reference to FIGS. 4 and 5 in accordance with one or more aspects of beamforming-based grant-free non-orthogonal multiple access transmission. The order in which the method blocks are described are not intended to be construed as a limitation, and any number of the described method blocks can be skipped or combined in any order to implement a method or an alternate method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 4:
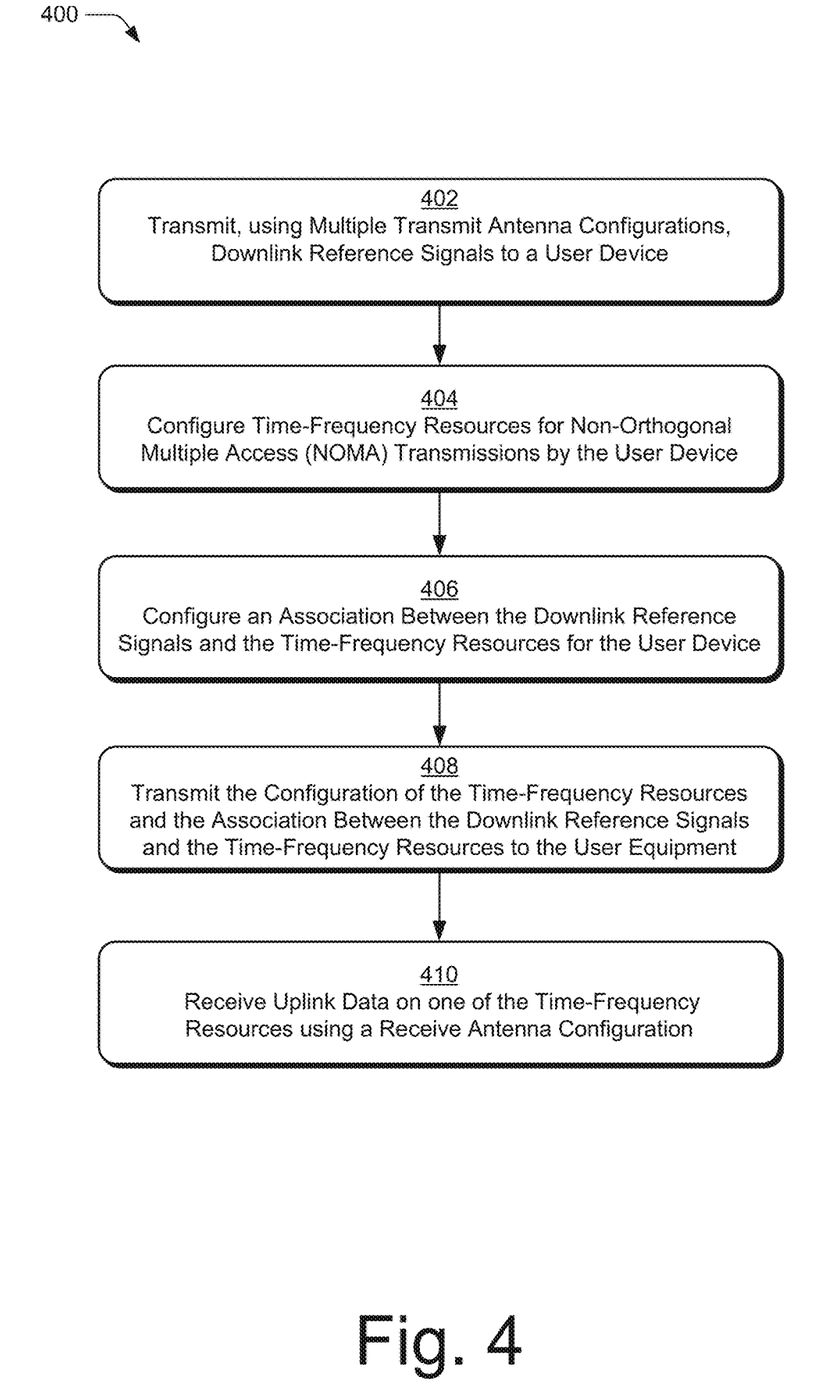
FIG. 4 illustrates an example method of beamforming-based grant-free non-orthogonal multiple access transmission as generally related to configuring resources for a wireless communication by a base station in accordance with aspects of the techniques described herein.

FIG. 4 illustrates example method(s) 400 of beamforming-based grant-free non-orthogonal multiple access transmission as generally related to communications by the base station 121. At block 402, a base station transmits, using multiple transmit antenna configurations, multiple downlink reference signals to a user equipment. For example, the base station 121 transmits multiple downlink signals using multiple transmit antenna configurations of the antennas 252.

At block 404, the base station configures time-frequency resources for Non-Orthogonal Multiple Access (NOMA) transmissions by the user equipment. For example, the base station 121 selects a configuration of resource elements 320 in the frequency domain, the time domain, or both, for NOMA transmissions by the user equipment 110.

At block 406, the base station configures an association between the downlink reference signals and the time-frequency resources for the user equipment. For example, the base station 121 configures an association between the downlink reference signals and the time-frequency resources for the user equipment 110.

At block 408, the base station transmits the configuration of the time-frequency resources and the association between the downlink reference signals and the time-frequency resources to the user equipment. For example, the base station 121 transmits the configuration of the time-frequency resources and the association between the downlink reference signals and the time-frequency resources to the user equipment 110.

At block 410, the base station receives uplink data from the user equipment on one of the time-frequency resources using a receive antenna configuration. For example, the base station 121 receives uplink data from the user equipment 110 on one of the time-frequency resources using a receive antenna configuration for the antennas 252.

Figure 5:
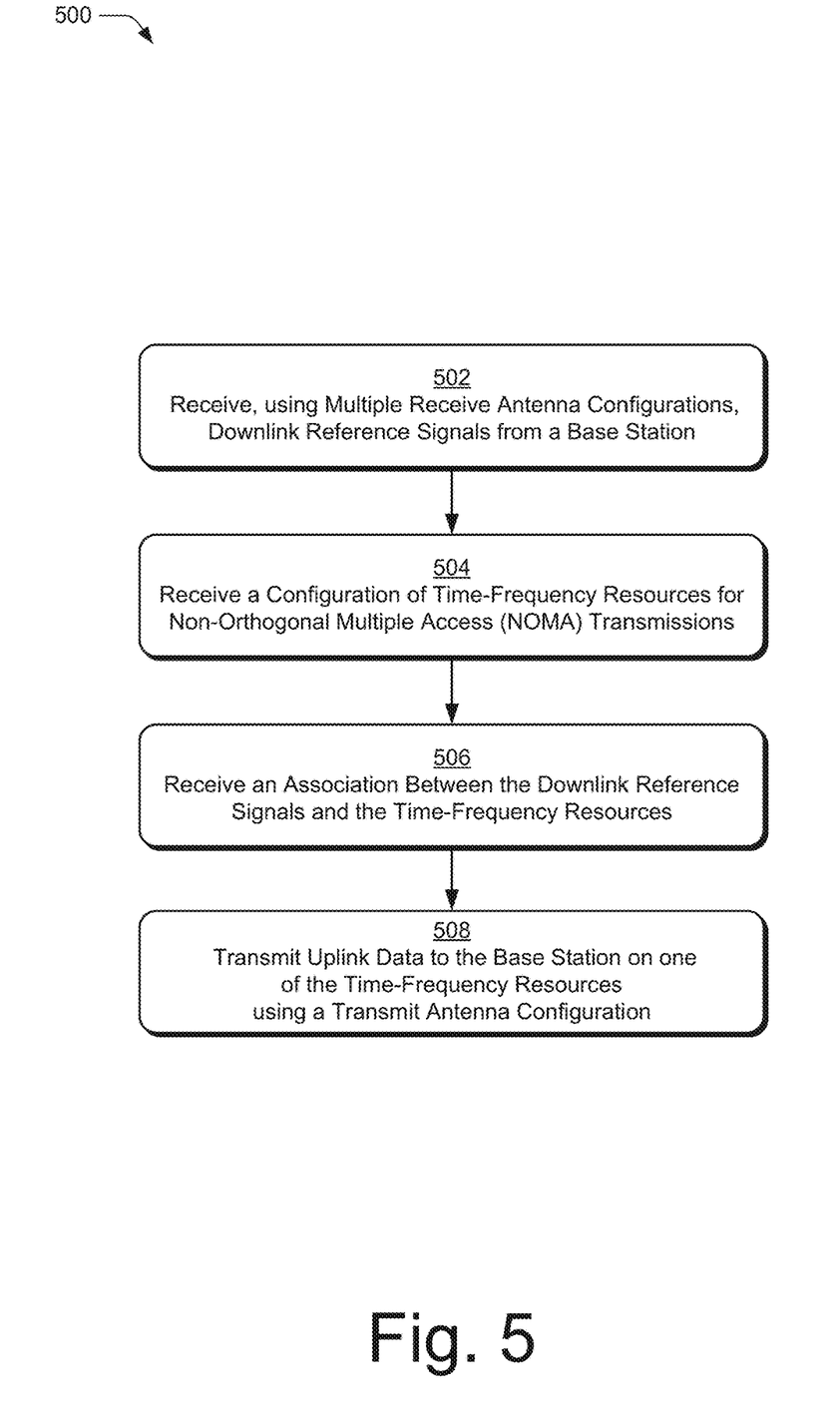
FIG. 5 illustrates an example method of beamforming-based grant-free non-orthogonal multiple access transmission as generally related to communications by a user equipment in accordance with aspects of the techniques described herein.

FIG. 5 illustrates example method(s) 500 of beamforming-based grant-free non-orthogonal multiple access transmission as generally related to the user equipment 110. At block 502, a user equipment receives, using multiple receive antenna configurations, downlink reference signals from a base station. For example, the user equipment 110 receives downlink reference signals from the base station 121 using multiple receive antenna configurations for the antennas 202.

At block 504, the user equipment receives a configuration of time-frequency resources for Non-Orthogonal Multiple Access (NOMA) transmissions from the base station. For example, the user equipment 110 receives a configuration of time-frequency resources for Non-Orthogonal Multiple Access (NOMA) transmission from the base station 121.

At block 506, the user equipment receives an association between the downlink reference signals and the time-frequency resources from the base station. For example, the user equipment 110 receives an association between the downlink reference signals and the time-frequency resources from the base station 121.

At block 508, the user equipment transmits uplink data to the base station on one of the time-frequency resources using a transmit antenna configuration. The transmit antenna configuration is determined based upon a measurement of one or more receive beams by the user equipment or is determined based on an indication from the base station that is based on an uplink measurement, by the base station, of one or more transmit beams of the user equipment. For example, the user equipment 110 transmits uplink data to the base station on one of the time-frequency resources using a transmit antenna configuration for the antennas 202.

The methods of FIGS. 4 and 5 may allow the determination of optimized antenna configurations in a simple manner.

In the following some examples are described.

Example 1: A method for configuring beamformed wireless communication between a base station and a user equipment, the method comprising:

transmitting, by the base station and using multiple transmit antenna configurations, downlink reference signals to the user equipment;

configuring, by the base station, time-frequency resources for Non-Orthogonal Multiple Access (NOMA) transmissions for the user equipment;

configuring an association between the downlink reference signals and the time-frequency resources for the user equipment;

transmitting the configuration of the time-frequency resources and the association between the downlink reference signals and the time-frequency resources to the user equipment; and receiving uplink data from the user equipment on one of the time-frequency resources using a receive antenna configuration, the receive antenna configuration being determined at least in part using one of the multiple transmit antenna configurations used for transmitting one of the downlink reference signals associated with the one of the of time-frequency resources as indicated in the association.

Example 2: The method of example 1, wherein each downlink reference signal is a synchronization signal block (SSB) or a channel state information-reference signal (CSI-RS).

Example 3: The method of example 1 or example 2, further comprising:

configuring a bit interleaving configuration, a bit scrambling configuration, a modulation symbol spreading configuration, a modulation symbol interleaving configuration, a modulation symbol scrambling configuration, or any combination thereof for a NOMA transmission from the user equipment.

Example 4: The method of example 3, wherein the uplink data is received by the base station based at least in part on the bit interleaving configuration, the bit scrambling configuration, the modulation symbol spreading configuration, the modulation symbol interleaving configuration, the modulation symbol scrambling configuration, or any combination thereof.

Example 5: The method of example 3 or example 4, wherein the time-frequency resources, the bit interleaving configuration, the bit scrambling configuration, the modulation symbol spreading configuration, the modulation symbol interleaving configuration, the modulation symbol scrambling configuration, or any combination thereof is configured for the user equipment and transmitted to the user equipment via system information or a dedicated higher-layer message.

Example 6: The method of any one of the preceding examples, wherein the multiple transmit antenna configurations, the receive antenna configuration, or both comprises a setting for adjusting transmission timing, reception timing, or both for a plurality of antennas.

Example 7: The method of any one of the preceding examples, the method further comprising:
receiving other uplink data from another user equipment on the one of the time-frequency resources using the receive antenna configuration.

Example 8: A method for beamformed communication between a base station and a user equipment, optionally according to any one of the preceding examples, the method comprising:
receiving, by the user equipment and using multiple receive antenna configurations, downlink reference signals from the base station;
receiving, from the base station, a configuration of time-frequency resources for Non-Orthogonal Multiple Access (NOMA) transmissions;
receiving an association between the downlink reference signals and the time-frequency resources from the base station; and
transmitting uplink data to the base station on one of the time-frequency resources using a transmit antenna configuration, the transmit antenna configuration being determined at least in part using one of the multiple receive antenna configurations used for receiving one of the downlink reference signals that is associated with the one of the of time-frequency resources as indicated in the association.

Example 9: The method of example 8, wherein each downlink reference signal is a synchronization signal block (SSB) or a channel state information-reference signal (CSI-RS).

Example 10: The method of example 8 or example 9, further comprising:
receiving, from the base station, a bit interleaving configuration, a bit scrambling configuration, a modulation symbol spreading configuration, a modulation symbol interleaving configuration, a modulation symbol scrambling configuration, or any combination thereof for performing a NOMA transmission.

Example 11: The method of example 10, wherein the uplink data is transmitted by the user equipment based at least in part on the bit interleaving configuration, the bit scrambling configuration, the modulation symbol spreading configuration, the modulation symbol interleaving configuration, the modulation symbol scrambling configuration, or any combination thereof.

Example 12: The method of example 10 or example 11, wherein the time-frequency resources, the bit interleaving configuration, the bit scrambling configuration, the modulation symbol spreading configuration, the modulation symbol interleaving configuration, the modulation symbol scrambling configuration, or any combination thereof are transmitted by the base station via system information or a dedicated higher-layer configuration message.

Example 13: The method of any one of examples 8 to 12, wherein the multiple receive antenna configurations, the transmit antenna configuration, or both comprises a setting for adjusting reception timing, transmission timing, or both for a plurality of antennas.

Example 14: A base station for configuring beamformed wireless communication with a user equipment, the base station comprising:
means for transmitting, by the base station and using multiple transmit antenna configurations, downlink reference signals to the user equipment;
means for configuring, by the base station, time-frequency resources for Non-Orthogonal Multiple Access (NOMA) transmissions for the user equipment;
means for configuring an association between the downlink reference signals and the time-frequency resources for the user equipment;
means for transmitting the configuration of the time-frequency resources and the association between the downlink reference signals and the time-frequency resources to the user equipment; and
means for receiving uplink data from the user equipment on one of the time-frequency resources using a receive antenna configuration, the receive antenna configuration being determined at least in part using one of the multiple transmit antenna configurations used for transmitting one of the downlink reference signals associated with the one of the of time-frequency resources as indicated in the association. The base station may comprise means for carrying out the method of any one of examples 1 to 7.

Example 15: The base station of example 14, wherein the multiple transmit antenna configurations, the receive antenna configuration, or both comprises a setting for adjusting transmission timing, reception timing, or both for a plurality of antennas.

Example 16. The base station of example 15, the base station comprising:
a plurality of phase shifters for the plurality of antennas, wherein the setting is realized by the plurality of phase shifters for the plurality of antennas.

Example 17: A user equipment for beamformed communication with a base station, the user equipment comprising:
means for receiving, by the user equipment and using multiple receive antenna configurations, downlink reference signals from the base station;
means for receiving, from the base station, a configuration of time-frequency resources for Non-Orthogonal Multiple Access (NOMA) transmissions;
means for receiving an association between the downlink reference signals and the time-frequency resources from the base station; and
means for transmitting uplink data to the base station on one of the time-frequency resources using a transmit antenna configuration, the transmit antenna configuration being determined, at least in part, using one of the multiple receive antenna configurations used for receiving one of the downlink reference signals that is associated with the one of the of time-frequency resources as indicated in the association. The user equipment may comprise means for carrying out the method of any one of examples 8 to 13.

Example 18: The user equipment of example 17, wherein the multiple receive antenna configurations, the transmit antenna configuration, or both comprises a setting for adjusting reception timing, transmission timing, or both for a plurality of antennas.

Example 19: The user equipment of example 18, the user equipment comprising: a plurality of phase shifters for the plurality of antennas, wherein the setting is realized by the plurality of phase shifters for the plurality of antennas Example 20: A computer program product comprising instructions which, when the program is executed by a computer, cause the computer to carry out the method of any one of examples 1 to 13.

Example 21: A system comprising means for carrying out the method of any one of examples 1 to 13, e.g., according to one of examples 1 to 7 and to one of examples 8 to 13. The system may comprise one or more UEs, and/or one or more base stations.

Although aspects of beamforming-based grant-free non-orthogonal multiple access transmission have been described in language specific to features and/or methods, the subject of the appended claims is not necessarily limited to the specific features or methods described. Rather, the specific features and methods are disclosed as example implementations of beamforming-based grant-free non-orthogonal multiple access transmission, and other equivalent features and methods are intended to be within the scope of the appended claims. Further, various different aspects are described, and it is to be appreciated that each described aspect can be implemented independently or in connection with one or more other described aspects.

What is claimed is:

1. A method for configuring beamformed wireless communication between a base station and a user equipment, the method comprising:
    transmitting, by the base station and using multiple transmit antenna configurations, downlink reference signals to the user equipment, at least one of the downlink reference signals as part of a synchronization signal block (SSB);
    configuring, by the base station, time-frequency resources for Non-Orthogonal Multiple Access (NOMA) transmissions for the user equipment;
    establishing an association between the downlink reference signals and the time-frequency resources for the user equipment;
    transmitting, to the user equipment, the time-frequency resources configuration for the NOMA transmissions and the association between the downlink reference signals and the time-frequency resources; and
    receiving uplink data from the user equipment on one of the time-frequency resources using a receive antenna configuration, the receive antenna configuration being determined at least in part using one of the multiple transmit antenna configurations used for transmitting one of the downlink reference signals associated with one of the time-frequency resources as indicated in the association.

2. The method of claim 1, wherein the multiple transmit antenna configurations comprise a setting for beamforming that adjusts transmission timing for a plurality of antennas used by the base station to transmit the downlink reference signals to the user equipment.

3. The method of claim 1, wherein the receive antenna configuration comprises a setting for beamforming that adjusts reception timing for a plurality of antennas used by the base station to receive uplink data from the user equipment.

4. The method of claim 1, the method further comprising:
    receiving other uplink data from another user equipment on the one of the time-frequency resources using the receive antenna configuration.

5. The method of claim 4, wherein receiving the other uplink data from the other user equipment includes decoding a multiple access signature associated to the other user equipment.

6. The method of claim 1, further comprising:
    establishing, by the base station, a NOMA wireless-communication configuration, the NOMA wireless-communication configuration comprising one or more of a bit interleaving configuration, a bit scrambling configuration, a modulation symbol spreading configuration, a modulation symbol interleaving configuration, or a modulation symbol scrambling configuration; and
    transmitting, to the user equipment, the NOMA wireless communication configuration.

7. The method of claim 6, wherein receiving the uplink data from the user equipment comprises:
    receiving the uplink data based at least in part on the NOMA wireless-communication configuration.

8. The method of claim 6, wherein the base station transmits the time-frequency resources configuration and the NOMA wireless-communication configuration to the user equipment via system information or a dedicated higher-layer message.

9. A method for beamformed communication between a base station and a user equipment, the method comprising:
    receiving, by the user equipment and using multiple receive antenna configurations, downlink reference signals from the base station, the multiple receive antenna configurations comprising a setting for beamforming that adjusts reception timing of a plurality of antennas used by the user equipment;
    receiving, from the base station, a configuration of time-frequency resources for Non-Orthogonal Multiple Access (NOMA) transmissions and an association between the downlink reference signals and the time-frequency resources for the NOMA transmissions; and
    transmitting uplink data to the base station on one of the time-frequency resources using a transmit antenna configuration, the transmit antenna configuration used by the user equipment and being determined, at least in part, using one of the multiple receive antenna configurations used by the user equipment for receiving one of the downlink reference signals that is associated with one of the time-frequency resources as indicated in the association.

10. The method of claim 9, wherein at least one downlink reference signal of the downlink reference signals is a synchronization signal block (SSB).

11. The method of claim 9, wherein at least one downlink reference signal is a channel state information-reference signal (CSI-RS).

12. The method of claim 9, further comprising:
    receiving, by the user equipment and from the base station, a NOMA wireless-communication configuration to be used by the user equipment while performing the NOMA transmissions, the NOMA wireless-communication configuration comprising one or more of a bit interleaving configuration, a bit scrambling configuration, a modulation symbol spreading configuration, a modulation symbol interleaving configuration, or a modulation symbol scrambling configuration.

13. The method of claim 12, wherein the user equipment receives the time-frequency resources and the NOMA wireless-communication configuration through system information or a dedicated higher-layer configuration message.

14. The method of claim 13, wherein the transmitting uplink data to the base station comprises:
transmitting the uplink data based at least in part on the NOMA wireless-communication configuration.

15. A base station for configuring beamformed wireless communication with a user equipment, the base station comprising:
means for transmitting, by the base station and using multiple transmit antenna configurations, downlink reference signals to the user equipment;
means for configuring, by the base station, time-frequency resources for Non-Orthogonal Multiple Access (NOMA) transmissions for the user equipment;
means for establishing an association between the downlink reference signals and the time-frequency resources for the user equipment;
means for transmitting, to the user equipment, the time-frequency resources configuration for the NOMA transmissions and the association between the downlink reference signals and the time-frequency resources to the user equipment; and
means for receiving uplink data from the user equipment on one of the time-frequency resources using a receive antenna configuration, the receive antenna configuration determined at least in part using one of the multiple transmit antenna configurations used for transmitting one of the downlink reference signals associated with one of the time-frequency resources as indicated in the association.

16. The base station of claim 15, further comprising a means for storing a setting for beamforming, the setting corresponding to a transmission timing for a plurality of antennas used by the base station to transmit the downlink reference signals to the user equipment.

17. The base station of claim 16, the base station comprising:
a plurality of phase shifters for the plurality of antennas, wherein the setting is realized by the plurality of phase shifters for the plurality of antennas.

18. A user equipment for beamformed communication with a base station, the user equipment comprising:
means for receiving, by the user equipment and using multiple receive antenna configurations, downlink reference signals from the base station, at least one of the downlink reference signals as part of a synchronization signal block (SSB);
means for receiving, from the base station, a configuration of time-frequency resources for Non-Orthogonal Multiple Access (NOMA) transmissions;
means for receiving an association between the downlink reference signals and the time-frequency resources from the base station; and
means for transmitting uplink data to the base station on one of the time-frequency resources using a transmit antenna configuration, the transmit antenna configuration being determined, at least in part, using one of the multiple receive antenna configurations used for receiving one of the downlink reference signals that is associated with one of the time-frequency resources as indicated in the association.

19. The user equipment of claim 18, further comprising:
a means for storing one or both of:
the multiple receive antenna configurations, the multiple receive antenna configurations including one or more settings for beamforming that adjust reception timing of a plurality of antennas; or
the transmit antenna configuration, the transmit antenna configuration including one or more other settings for beamforming that adjust transmission timing of the plurality of antennas.

20. The user equipment of claim 19, further comprising:
a plurality of phase shifters to realize adjustments to one or both of:
the reception timing of the plurality of antennas; or
the transmission timing of the plurality of antennas.

* * * * *